United States Patent Office 3,635,902
Patented Jan. 18, 1972

3,635,902
PRODUCTS
Robert G. Thompson, Signal Mountain, Tenn., assignor to E. I. du Pont de Nemours and Company, Wilmington, Del.
No Drawing. Division of application Ser. No. 509,245, Oct. 18, 1965, now Patent No. 3,492,272, which is a division of application Ser. No. 264,783, Mar. 13, 1963, now Patent No. 3,467,719, which in turn is a continuation-in-part of application Ser. No. 187,982, Apr. 16, 1962. Divided and this application Dec. 29, 1969, Ser. No. 888,935
The portion of the term of the patent subsequent to Jan. 27, 1987, has been disclaimed
Int. Cl. C08g 17/08
U.S. Cl. 260—75 R          3 Claims

ABSTRACT OF THE DISCLOSURE

The application discloses a class of glycols containing two hydroxycyclohexyl groups, and linear condensation polyesters prepared therefrom which are characterized by recurring units of the formula

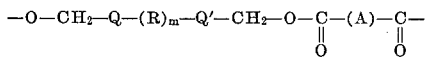

wherein $m$ is 0 or 1, Q and Q' are 1,3- or 1,4-cyclohexylene or alkyl derivatives thereof, R is an alkylene radical, and A is a divalent saturated hydrocarbon radical containing a 6-membered carbocyclic nuclei. Polyesters particularly suitable for textile fibers are illustrated.

REFERENCES TO RELATED APPLICATIONS

This is a division of my application Ser. No. 509,245, filed Oct. 18, 1965, now U.S. Pat. No. 3,492,272 which is a division of my application Ser. No. 264,783, filed Mar. 13, 1963, now U.S. Pat. No. 3,467,719, which is a continuation-in-part of my application Ser. No. 187,982, filed Apr. 16, 1962, and now abandoned.

The invention relates to a novel class of polyesters derived from alicyclic glycols of high molecular weight. More particularly, it relates to polyesters from glycols containing at least 14 carbon atoms and characterized by the presence of two hydroxymethylcyclohexyl groups. The invention also comprehends fibers, films, and other shaped articles produced from the polymers.

In general, the glycol component of the polyester contains two hydroxymethylcyclohexyl groups, any additional constituents of the glycol being selected from the class consisting of ether oxygen and saturated hydrocarbon groups having a total of up to 8 carbon atoms, including the class of bis-(hydroxymethylcyclohexyl)alkanes having up to 22 total carbon atoms.

It has been found that these glycols can be prepared readily and that they have excellent utility for reaction with dicarboxylic acids or ester-forming derivatives thereof to prepare linear condensation polyesters. The novel polyesters are characterized by generally high melting points and are particularly adapted for the preparation of fibers, films, tapes, and the like as well as other shaped articles obtained by using the polyesters as molding compositions.

The invention comprises polyesters from the class of glycols having the general formula:

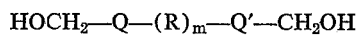

wherein Q and Q' are saturated divalent hydrocarbon radicals of the group consisting of 1,3-cyclohexylene, 1,4-cyclohexylene, and lower alkyl derivatives thereof; $m$ is 0 or 1; and R is a saturated divalent hydrocarbon radical of 1 to 8 carbon atoms. Preferably a chain of carbon atoms connecting the said Q and Q' radicals contains not more than 4 carbon atoms. R may therefore represent any alkylene radical of up to 8 carbon atoms, either straight chain, branched chain, or cyclic. Polyesters prepared from these glycols or their esters are useful not only for films and molded articles but also are especially useful for forming fibers. A preferred class of glycols, particularly useful as components of such fiber-forming polymers, are the bis (4-hydroxymethylcyclohexyl)alkanes of up to 22 carbon atoms represented by the formula:

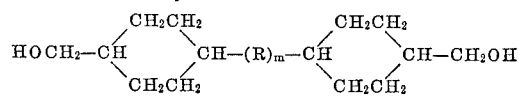

wherein $m$ and R are defined as above.

As described in my U.S. Pat. 3,467,719, issued Sept. 16, 1969, a useful general method for obtaining the novel glycols comprises a two-stage reduction of the corresponding bibenzoic acids or bis(carboxyphenyl)alkanes or ethers, involving reduction of the aromatic (benzene) nuclei to alicyclic (cyclohexane) nuclei followed by reduction of the carboxyl groups to hydroxymethyl groups. Reduction of the benzene nuclei is conveniently achieved by hydrogenation of an ester of the acid using platinum oxide or ruthenium as a catalyst; while reduction of the carboxylic groups of the resulting alicyclic ester is readily obtained by hydrogenation with a catalyst such as copper chromite or by reaction with lithium aluminum hydride. The glycol products so obtained consist in each case of a mixture of various geometrical isomers, i.e., compounds having the same carbon skeleton but occurring in various cis- and trans-forms, and, in the case of glycols having the hydroxymethyl groups in the 2- or 3-positions, occurring in syn- and anti-forms as well. It has been found that the glycol mixtures obtained in this way can be purified readily to eliminate traces of esters and other non-glycol impurities by conventional purification procedures such as recrystallization or distillation, and that the glycol products obtained in this form have excellent utility in the preparation of polyesters without separating the isomers unless it is so desired.

Examples of the glycols useful in preparing the polyesters of the present invention are shown in Table I.

TABLE I

Glycol (1) Bis(4-hydroxymethylcyclohexyl)
(2) Bis(3-hydroxymethylcyclohexyl)
(3) 3,4'-bis(hydroxymethyl)bicyclohexyl
(4) Bis(4-hydroxymethyl-2-methylcyclohexyl)
(5) Bis(4-hydroxymethyl-3-methylcyclohexyl)
(6) Bis(3-hydroxymethyl-6-methylcyclohexyl)
(7) Bis(3-hydroxymethyl-6-isopropylcyclohexyl)
(8) Bis(4-hydroxymethylcyclohexyl)methane
(9) Bis(3-hydroxymethylcyclohexyl)methane
(10) 1,1-bis(4-hydroxymethylcyclohexyl)ethane
(11) 1,2-bis(4-hydroxymethylcyclohexyl)ethane
(12) 1,2-bis(3-hydroxymethylcyclohexyl)ethane
(13) 2,2-bis(4-hydroxymethylcyclohexyl)propane
(14) 1,3-bis(4-hydroxymethylcyclohexyl)propane
(15) 1,4-bis(4-hydroxymethylcyclohexyl)butane
(16) 1,1-bis(4-hydroxymethylcyclohexyl)butane
(17) 1,1-bis(3-hydroxymethylcyclohexyl)butane
(18) 1,2-dimethyl-1,2-bis(4-hydroxymethylcyclohexyl) butane
(19) 3,3-bis(3-hydroxymethylcyclohexyl)pentane
(20) 3,4-dimethyl-3,4-bis(4-hydroxymethylcyclohexyl) hexane
(21) 1,4-bis(4-hydroxymethylcyclohexyl)cyclohexane
(22) 1,3-bis(4-hydroxymethylcyclohexyl)cyclohexane
(23) Bis(4-hydroxymethylcyclohexyl)ether

(24) Bis(4-hydroxymethylcyclohexyloxy)ethane
(25) Bis(4-hydroxymethylcyclohexyloxy)butane
(26) 2,8-bis(hydroxymethyl)dodecahydrodibenzofuran
(27) Bis(2-hydroxymethylcyclohexyl)
(28) 2,3'-bis(hydroxymethyl)bicyclohexyl
(29) 2,4'-bis(hydroxymethyl)bicyclohexyl
(30) 3,4'-dimethyl-bis(2-hydroxymethylcyclohexyl)
(31) Bis(2-hydroxymethyl-4-methylcyclohexyl)
(32) Bis(2-hydroxymethyl-5-methylcyclohexyl)
(33) Bis(4-hydroxymethyl-3-methoxycyclohexyl)
(34) Bis(2-hydroxymethyl-5-methoxycyclohexyl)
(35) 6-ethyl-bis(2-hydroxymethylcyclohexyl)
(36) 4'-isopropyl-3-methyl-bis(2-hydroxymethylcyclohexyl)
(37) Bis(2-hydroxymethylcyclohexyl)methane
(38) 2,4'-bis(hydroxymethylcyclohexyl)methane
(39) Bis(3-hydroxymethyl-4-methoxycyclohexyl)methane
(40) 1,2-bis(2-hydroxymethylcyclohexyl)ethane
(41) 1,2-bis(2-hydroxymethyl-6-methylcyclohexyl)ethane
(42) 2,2-bis(2-hydroxymethylcyclohexyl)butane Although the glycol products obtained from the two-stage reduction sequence can be employed directly in the preparation of polyesters, it has been found that specific geometric isomers can be prepared and also that an isomerization step can be provided to alter the ratio of the various isomers contained in the product. In the case of bis(4-hydroxymethylcyclohexyl), for example, it has been found that hydrogenation of dimethyl 4,4'-bibenzoate yields a mixture of three isomeric dimethyl dodecahydro-4,4'-bibenzoates. Recrystallization of the isomeric ester mixture from 90% methanol/10% water yields a first crop of relatively pure crystals of one of the geometrical isomers of dimethyl dodecahydro-4,4'-bibenzoate, exhibiting a melting point of 98° C. Reduction of this isomer of the ester with lithium aluminum hydride produces a single pure geometrical isomer of the glycol, designated herein as "c,c"-bis(4-hydroxymethylcyclohexyl), having a melting point of 123° C. and yielding a dibenzoate ester having a melting point of 113° C. This isomer is illustrated by the following structural formula in which each of the hydroxymethyl groups is cis to the bond connecting the two cyclohexane rings:

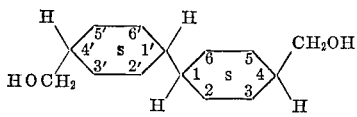

wherein the carbon atoms in the 1, 1', 4, and 4' positions as well as the hydrogen atoms attached to these positions and the carbon atoms of the hydroxymethyl groups lie in the plane of the paper, the 2, 2', 3, and 3' carbon atoms are situated above the plane of the paper, the 5, 5', 6, and 6' carbon atoms are situated below the plane of the paper, and the symbol s indicates that the ring is saturated (i.e., that the 6-membered ring is a cyclohexane ring).

As described above, hydrogenation of dimethyl 4,4'-bibenzoate to a mixture of dimethyl dodecahydro-4,4'-bibenzoates followed by recrystallization results in separation of quantities of one of the pure isomers (M.P. 98° C.). Saponification of the esters remaining in the mother liquor to the sodium salts of the mixed acids yields a solution from which part of the remaining product can be salted out as a relatively pure isomer. The salted-out product, when esterified with methanol, yields a geomtrical isomer of dimethyl dodecahydro-4,4'-bibenzoate melting at 116° C., differing from the isomeric ester melting at 98° C. described above. Reduction of the ester melting at 116° C. with lithium aluminum hydride produces a pure geometrical isomer of the glycol, designated herein as "t,t" - bis(4 - hydroxymethylcyclohexyl), which has a melting point of 184° C. and yields a dibenzoate ester having a melting point of 127° C. This isomer is illustrated by the following structural formula in which each of the hydroxymethyl groups is trans to the bond connecting the two cyclohexane rings:

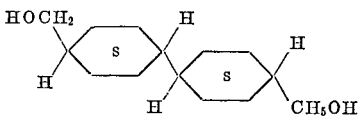

trans,trans-bis(4-hydroxymethylcyclohexyl)

wherein each of the symbols is employed as previously defined.

From the residual liquid remaining after the salting out procedure described above in working up the mixture of dodecahydro-4,4'-bibenzoates is obtained a mixed acid which, when recrystallized from aqueous acetic acid and esterified with methanol, yields the third isomer of dimethyl dodecahydro-4,4'-bibenzoate in 80% purity. Reduction of this ester with lithium aluminum hydride, followed by repeated recrystallizations from aqueous ethanol and then from ethyl acetate, produces a pure geometrical isomer of the glycol, designated herein as "c,t"-bis(4-hydroxymethylcyclohexyl), which has a melting point of 135° C. and yields a dibenzoate ester having a melting point of 76° C. This isomer is illustrated by the following structural formula in which one of the hydroxymethyl groups is cis to the bond connecting the two cyclohexane rings and the other is trans:

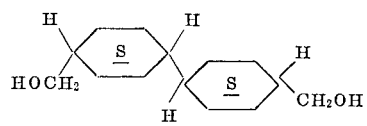

cis,trans-bis(4-hydroxymethylcyclohexyl)

It has been found that the preparation of the "t,t"-bis-(4-hydroxymethylcyclohexyl) isomer is greatly facilitated by saponifying the crude hydrogenation product comprising the three isomeric dimethyl dodecahydro-4,4'-bibenzoates to the corresponding mixture of isomeric acids, followed by heating the mixed acids at 300° C. in vacuum. The acids are isomerized substantially completely to the isomer of the acid most stable to heat; and upon esterification of the acid and reduction with lithium aluminum hydride it is found that the "t,t"-isomer of the glycol is obtained. By this process high yields are obtained in the conversion of the 4,4'-bibenzoate starting material to "t,t"-bis(4-hydroxymethylcyclohexyl).

Similarly, other mixtures of alicyclic acid isomers obtained as intermediates in the preparation of the novel glycols of the invention may be isomerized with aid of heat to the most stable isomer, normally the trans, trans-isomer, as a step in the production in high yield of the corresponding pure geometrical isomer of the glycol. For instance, dodecahydro-1,2-bis(4 - carboxyphenyl)ethane may be heated to 300° C. in vacuum, followed by esterification of the acid and reduction with lithium aluminum hydride, to form a pure geometrical isomer of the corresponding glycol, designated herein as "t,t"-1,2-bis(4-hydroxymethylcyclohexyl)ethane, which has a melting point of 167° C. and forms a dibenzoate ester having a melting point of 109° C. This isomer is illustrated by the following structural formula:

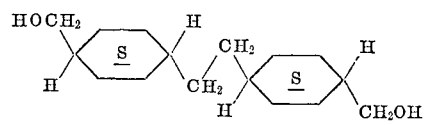

trans,trans-1,2-bis(4-hydroxymethylcyclohexyl)ethane

The novel polymers of the invention may be composed of terephthalic acid and at least one of said glycols containing two hydroxymethylcyclohexyl groups.

A preferred embodiment of the invention comprises crystalline linear polymeric fiber-forming terephthalate polyesters consisting essentially of units of the following formula:

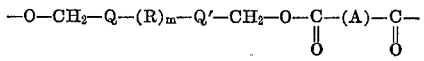

in which A is a saturated divalent hydrocarbon radical of the group consisting of p-phenylene and 1,4-cyclohexylene; Q and Q' are saturated divalent hydrocarbon radicals of the group consisting of 1,3-cyclohexylene, 1,4-cyclohexylene and lower alkyl derivatives thereof; $m$ is 0 or 1; and R is a saturated divalent hydrocarbon radical of 1 to 8 carbon atoms which preferably has at most 4 carbon atoms in the chain connecting Q and Q'. The polyester may contain a minor amount (preferably 2 to 3 mole percent) of a dicarboxylic acid or a hydroxy component carrying a metallic sulfonate salt, e.g., 5-(sodium sulfo) isophthalic acid. Preferably A in the above formula is p-phenylene, corresponding to the arylene group of terephthalic acid, but the invention also includes terephthalate/hexahydroterephthalate copolyesters wherein up to 25 mole percent of said recurring units are ones in which A is 1,4-cyclohexylene. The polyesters are prepared by reacting the dicarboxylic acid or an ester-forming derivative thereof, as described above, with one of the said cycloalkylene glycols, i.e., bis(hydroxymethylcyclohexyl) or a bis(hydroxymethylcyclohexyl)alkane or ether, or an ester-forming derivative of the desired glycol. By an ester-forming derivative of the glycol is meant a derivative of the novel glycol containing functional groups equivalent to the hydroxyl groups in their ability to react with carboxyl groups, such as esters of the glycol with acetic acid or other lower aliphatic acids.

A convenient method for preparing the polymers involves reaction of an alkyl ester of a terephthalic acid with one of the novel cycloalkylene glycols in an ester interchange reaction followed by polycondensation at high temperature and at low partial pressure of the glycol, until a polymer of the desired molecular weight is produced. In carrying out the ester interchange reaction, at least one molecular proportion of the novel cycloalkylene glycol per molecular proportion of the dicarboxylic ester should be used, preferably about 1.5 to 1.8 mols of the glycol per mol of the ester. It is desirable to employ an ester of the dicarboxylic acid formed from an alcohol or a phenol with a boiling point considerably below that of the novel cycloalkylene glycol so that the former can be removed easily from the reaction zone by distillation. It is preferred to use the methyl or ethyl esters, as these esters are formed from alcohols which, because of their relatively low boiling points, are easily separated by distillation from the glycol. Heating should be above the melting point of the reaction mixture and above the boiling point of the alcohol or phenol to be displaced. Heating should be effected under conditions such that the displaced alcohol or phenol can be removed from the reaction zone, usually by means of conventional distillation equipment. The heating is usually at atmospheric pressure, but higher or lower pressures may be used if desired. The ester interchange reaction is advantageously carried out in the presence of ester interchange catalysts such as manganous acetate, calcium acetate, litharge, sodium methoxide, sodium hydrogen hexabutoxytitanate, tetra-alkyl titanates such as tetraisopropyl titanate, or other suitable ester interchange catalysts as described in the literature relating to preparation of polyesters.

Following the ester interchange reaction, heating is continued under reduced pressure until the excess glycol is removed and the polymerization reaction has proceeded to the desired degree. The final stages of polymerization may be carried out with polymer in the molten state or, if desired, the reaction may be completed by solid phase polymerization. The polymerization reaction may be carried out in the presence of catalysts such as antimony trioxide, litharge, zinc acetate, or other suitable polycondensation catalysts as described in the literature. Sodium hydrogen hexabutoxytitanate and the tetra-alkyl titanates such as tetraisopropyl titanate are examples of catalysts which may be used for both the ester interchange and polymerization steps.

Within the broad range of useful polymers, including lower melting polyesters suitable for molding compositions, it is generally considered that those polyesters melting above about 200° C. and as high as about 325° C. are especially advantageous for extrusion in unmodified form to produce fibers and films. Many of the novel polyesters of this invention are even higher melting and are especially adapted for high temperature applications, e.g., for use in electrical tapes and in the manufacture of insulators for electric motors, etc. Extrusion or shaping of the higher melting polyesters is generally facilitated by the use of plasticizers, especially by plasticizers such as 1.2-diphenoxyethane or p-toluenesulfonamide which may be removed from the shaped polyester article by leaching with water or other solvent, or by heating at a temperature sufficient to drive off the plasticizer. Polyesters having an intrinsic viscosity of at least about 0.2 are considered to be of sufficiently high molecular weight for utility in forming molded articles as well as films. For use in extruding fibers and filaments, polycondensation is usually continued until the intrinsic viscosity is at least about 0.3.

As used herein, the "polymer-melt temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers, Inc., N.Y., pages 49–50 (1961).

EXAMPLE 1

Poly(Bicyclohexyl-4,4'-dimethylene 4,4'-bibenzoate)

Into a small polymer tube is placed 6.75 g. of dimethyl 4,4'-bibenzoate (0.025 mol), 12.45 g. of bis(4-hydroxymethylcyclohexyl) (0.055 mol), prepared as described in part G of Example 1 of U.S. Pat. No. 3,467,719, and 6 drops of an 8% solution of sodium hydrogen hexabutoxytitanate in n-butanol as a catalyst. The ingredients are melted and a capillary for nitrogen flow is inserted into the polymer tube. Ester exchange is carried out for 2.5 hours at 230° C. with evolution of methanol, after which the flow of inert gas is changed from nitrogen to xylene, the temperature is raised to 285° C., and vacuum is applied gradually until the pressure is reduced to 0.07 mm. of mercury. After 2.5 hours of polymerization at this temperature and pressure with a continuous slow stream of xylene maintained through the tube, the mixture is cooled and a white solid having an intrinsic viscosity of 0.56 is produced.

The polymeric material prepared as described above is crushed to a coarse powder and then heated for 4 hours under vacuum with a small bleed of nitrogen at 225° C. At the conclusion of this solid phase polymerization reaction, the intrinsic viscosity of the polymer is 0.65 and the polymer-melt temperature, PMT, is 255° C.

The term "intrinsic viscosity", as used herein, is defined as the limit of the fraction $$\frac{\ln(r)}{c}$$

as c approaches 0, where (r) is the relative viscosity, and c is the concentration in grams per 100 ml. of solution. The relative viscosity (r) is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

A molten sample of the poly(bicyclohexyl-4,4'-dimethylene 4,4'-bibenzoate) product prepared by solid phase polymerization is extruded to form a filament, using conventional techniques. The undrawn filament has a $T_g$ of 97° C. The filament is oriented by drawing it around a pair of rolls between which is situated a heating block curved on each side and maintained at 150° C., using a draw ratio of 3×. The intrinsic viscosity of the polymer in the form of the oriented filament is measured and found to be 0.59. The residual elongation of the filament is 12%. The drawn filament is heat treated by boiling it in water for 15 minutes, heating it in an oven at 180° C. for 3 minutes, and finally immersing it in boiling water again for 15 minutes. The heat-treated filament has a tenacity of 1.9 g.p.d., an elongation of 16%, and an initial modulus of 41 g.p.d. Values for "tensile strain recovery" (TSR) and "moduli relaxation index" (MRI) are 74% and 0.05, respectively. The filament is insoluble in perchloroethylene and is oriented and crystalline as shown by X-ray diffraction patterns.

"$T_g$," the "second order transition temperature," is defined herein as the temperature at which a discontinuity occurs in the curve of a first derivative thermodynamic quantity with temperature. It is correlated with yield temperature and polymer fluidity and can be observed from a plot of density, specific volume, specific heat, sonic modulus or index of refraction against temperature. A convenient method for determining $T_g$ for a given sample of polymer is given by Pace in his U.S. Pat. 2,556,295 (col. 3, line 24 to col. 4, line 19).

The TSR of a filament is determined by mounting a 10-inch length of the filament on a tensile tester with recording chart (commercially available from the Instron Engineering Corporation, Quincy, Mass.) and also equipped with a circulating water bath which can be raised and lowered. The water bath, maintained at 40° C., is raised to immerse the filament. After the filament has been immersed for 2 minutes without tension it is stretched, in the water bath, at an elongation rate of 1 inch per minute. Upon reaching the desired total elongation, the sample is held at constant length for an additional 2 minutes and the water bath is removed. The load on the filament is then reduced to a value of 0.042 g.p.d, and the filament is allowed to retract. Percent recovery is calculated from the formula:

$$\frac{\text{units of retraction}}{\text{units of elongation}} \times 100\%$$

This procedure is carried out for elongations of 0.5, 1, 2, and 3%, and a graph is prepared by plotting the percent recovery against total elongation in the range 0–3%. TSR values are average percent recovery values from the range 0–3% elongation which may be determined from the graph by usual graphical averaging procedures.

Filaments having TSR values of 60% are considered to have good tensile recovery, while filaments exhibiting TSR values of 70% and above are considered quite superior.

The MRI of a filament is determined by mounting a 10-inch length of the filament on a tensile tester of the above type, except that the tester is additionally equipped with a tube heater surrounding the filament. The filament is first heated for 4 minutes at 70° C. with the tube heater, after which it is stretched while hot to an extension of 1%±0.05%. Upon reaching 1% elongation, the sample is held at constant length for about 1 minute, still at 70° C., during which time the force required to maintain the filament at this extension is recorded on the chart. The cross head of the tensile tester is then returned to its original position, leaving the filament with a small amount of slack. The circulating water bath, maintained at 70° C., is raised so that the filament is submerged. After the sample has been heated in water for 4 minutes at this temperature, the slack is taken up and the sample is stretched again to 1%±0.05% elongation. The cross head is then finally returned again to its original position. Data are then taken from the chart of the tensile tester to calculate the dry and wet moduli and the loss factor, as follows:

$$G_{(dry)} = \frac{F_a}{\text{denier}} \times \frac{100}{\text{percent extension}}$$

$$G_{(wet)} = \frac{F_a'}{\text{denier}} \times \frac{100}{\text{percent extension}}$$

$$L = \frac{F_a - F_b}{F_a}$$

$$MRI = \frac{G_{(dry)}}{G_{(wet)}} \times L$$

where $G_{(dry)}$ is the dry modulus and $G_{(wet)}$ is the wet modulus, $F_a$ is the initial force required to achieve 1% elongation in the dry filament and $F_a'$ is the initial force required to achieve 1% elongation in the wet filament, $F_b$ is the force required to maintain the dry filament at constant 1% elongation 45 seconds after 1% elongation is initially achieved, and L is the loss factor. Low values of MRI are indicative of a high predicted fabric recovery, especially values below 0.2. Comparative MRI values for commercial 6–6 nylon and polyethylene terephthalate fibers are 0.9 and 0.2, respectively.

EXAMPLE 2

Copolyester fibers and films of improved dyeability with basic dyes

The procedure described in Example 4 for preparation of poly(bicyclohexyl-4,4'-dimethylene 4,4'-bibenzoate) is repeated, substituting in place of the dimethyl 4,4'-bibenzoate a mixture of 0.0243 mol of dimethyl 4,4'-bibenzoate and 0.0007 mol of sodium 3,5-di(carbomethoxy)benzenesulfonate. The product, poly[bicyclohexyl-4,4'-dimethylene 4,4'-bibenzoate/5-(sodium sulfo)isophthalate], 97/3 mol percent, yields a clear, tough, drawable film which exhibits greatly enhanced dyeability with Fuchsine SBP dye (C.I. 42,510) and other basic dyes as contrasted with a film of the corresponding homopolyester of Example 4, which has virtually no affinity for these basic dyes. Orientable fibers dyeable with basic dyes can be pulled from the copolyester melt.

In the following examples, dimethyl terephthalate (0.03 mol) is polycondensed with various glycols (0.06 mol) in general accordance with the melt polymerization method of Example 1. In Example 14, a copolyester is prepared by replacing 25% of the dimethyl terephthalate with the corresponding molar amount of dimethyl hexahydroterephthalate.

TEREPHTHALATE POLYESTERS AND COPOLYESTERS

| Example Number | Glycol employed | PMT (° C.) | Intrinsic viscosity |
|---|---|---|---|
| 3 | "c,c-" bis(4-hydroxymethylcyclohexyl) | 220 | 0.5 |
| 4 | "t,t-" bis(4-hydroxymethylcyclohexyl) | 298 | (insol.) |
| 5 | 40% "c,t-"/60% "t,t-" bis(4-hydroxymethylcyclohexyl). | >300 | 0.4 |
| 6 | "c,c-" bis(4-hydroxymethylcyclohexyl) methane. | 130 | 0.47 |
| 7 | "t,t-" bis(4-hydroxymethylcyclohexyl) methane. | 280 | (insol.) |
| 8 | "c,c-" 1,2-bis(4-hydroxymethylcyclohexyl)ethane. | 180 | 0.50 |
| 9 | "t,t-" 1,2-bis(4-hydroxymethylcyclohexyl)ethane. | 300 | (insol.) |
| 10 | "c,c-" 2,2-bis(4-hydroxymethylcyclohexyl)propane. | 255 | 0.87 |
| 11 | "t,t-" 2,2-bis(4-hydroxymethylcyclohexyl)propane. | 320 | (insol.) |
| 12 | "t,t-" 1,3-bis(4-hydroxymethylcyclohexyl)propane. | 180 | 0.4 |
| 13 | "c,syn,c-" bis(3-hydroxymethylcyclohexyl). | 330 | (insol.) |
| 14 | 40% "c,t-"/60% "t,t-" bis(4-hydroxymethylcyclohexyl); copolyester from 75% dimethyl terephthalate/25% dimethyl hexahydroterephthalate. | 246 | 0.49 |

The polymer of Example 3 is extruded at 265° C. to form a filament, using conventional techniques. The filament is oriented by drawing it 3× over a 90° C. pin. The drawn filament is oriented but amorphous as shown by X-ray diffraction patterns. The drawn filament is heat treated by boiling it in water for 15 minutes, heating it in an oven at 160° C. for 3 minutes, and finally immersing it in boiling water again for 3 minutes. The heat-treated filament is oriented and crystalline as shown by X-ray diffraction patterns. It has a tenacity of 0.9 g.p.d., an elongation of 5%, and an initial modulus of 34 g.p.d. Values for TSR and MRI, as defined in Example 1, are 71% and 0.14, respectively.

We claim:

1. A crystalline linear polymeric fiber-forming terephthalate polyester consisting essentially of recurring units of the following formula:

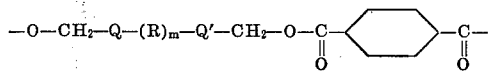

wherein Q and Q' are saturated divalent hydrocarbon radicals of the group consisting of 1,3-cyclohexylene, 1,4-cyclohexylene and lower alkyl derivatives thereof; $m$ is 0 or 1; and R is a saturated divalent hydrocarbon radical of 1 to 8 carbon atoms of which at most 4 carbon atoms are in the chain connecting Q and Q'.

2. A polyester as defined in claim 1 of a bis(4-hydroxymethylcyclohexyl)alkane of 15 to 18 carbon atoms and terephthalic acid.

3. A polyester as defined in claim 1 which is poly(bicyclohexyl-4,4'-dimethylene terephthalate).

References Cited

UNITED STATES PATENTS

| | | | |
|---|---|---|---|
| 3,227,682 | 1/1966 | Hornbaker | 260—47 |
| 3,492,272 | 1/1970 | Thompson | 260—75 |

OTHER REFERENCES

Hill et al.: J. Polym. Sci. 3, 619–20 (1948).

MELVIN GOLDSTEIN, Primary Examiner